UNITED STATES PATENT OFFICE.

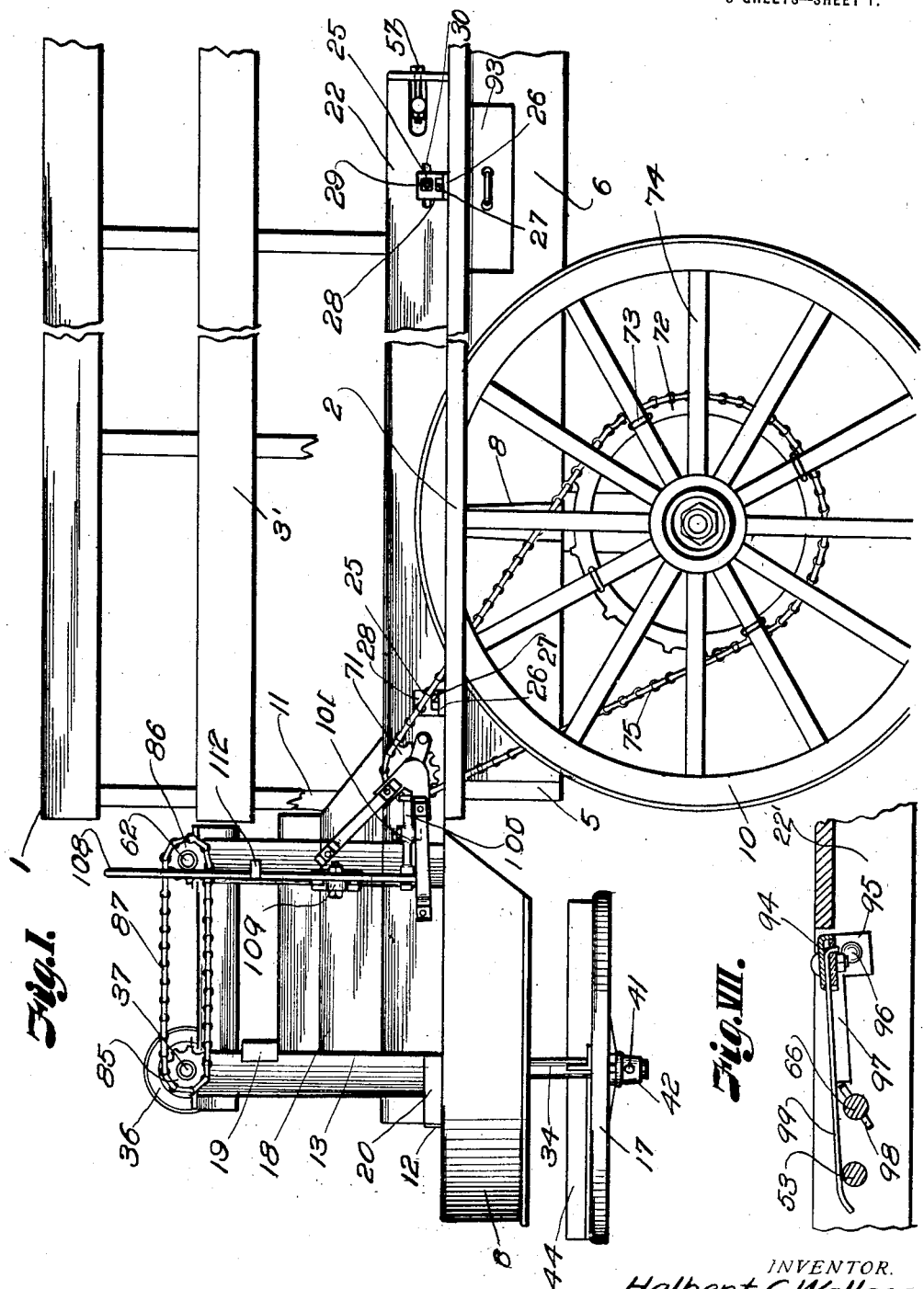

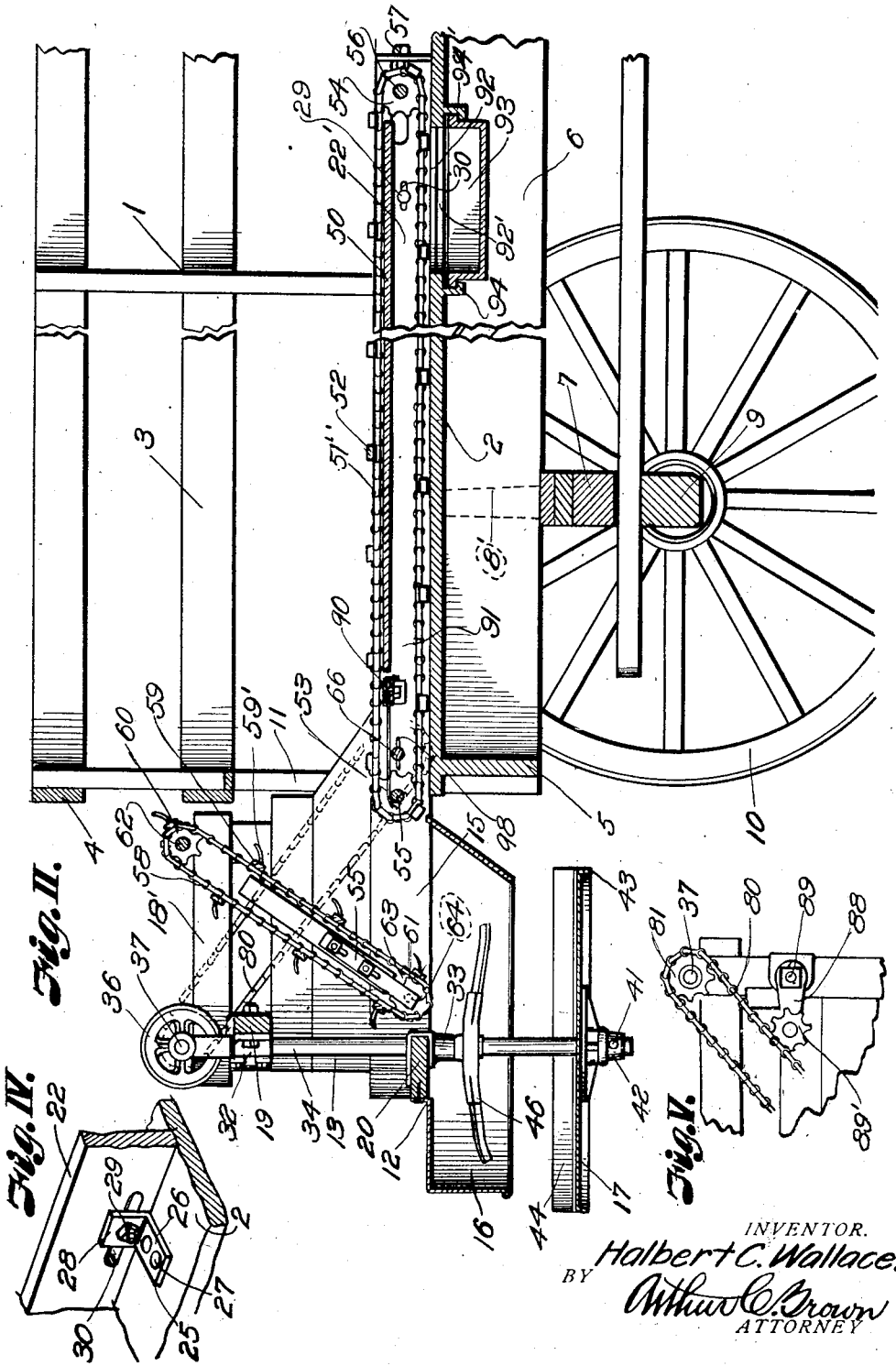

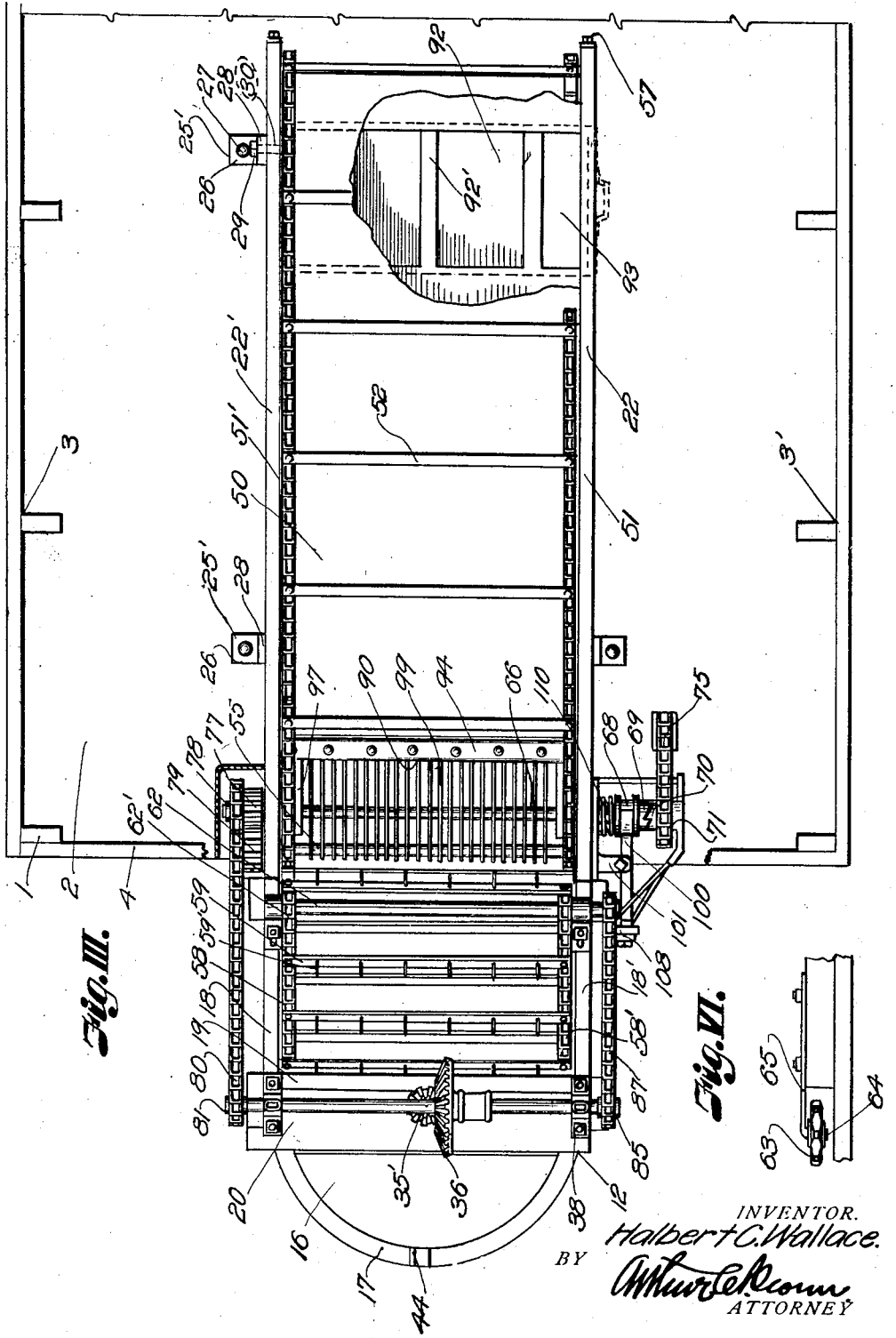

HALBERT C. WALLACE, OF KANSAS CITY, MISSOURI.

STRAW-SPREADING MECHANISM.

1,347,606.

Specification of Letters Patent.

Patented July 27, 1920.

Application filed October 19, 1918. Serial No. 258,801.

*To all whom it may concern:*

Be it known that I, HALBERT C. WALLACE, a citizen of the United States, residing at Kansas City, in the county of Jackson and State of Missouri, have invented certain new and useful Improvements in Straw-Spreading Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to straw distributing mechanism, and more particularly to a device for distributing straw, or the like, over a ground surface to conserve the moisture, and to fertilize and prevent blowing of the soil; the principal object of the invention being to provide a device of this character, comprising feeding, driving and distributing mechanism complete in one structure, and which may be easily attached within or removed from the ordinary farm rack, header barge or wagon without impairing the usefulness of the carrying vehicle for other purposes when the distributing device is removed.

A further object of the invention is to provide simple and effective means for anchoring the device within the wagon or rack to which it is applied so that it may be attached or detached in the least possible time, and with a minimum amount of labor.

A further object of the invention is to provide means for effecting a forced feed of material into the distributing mechanism, whereby the material will be combed and torn apart to destroy all bunches, or tangled masses, so that an even distribution will be made.

Another object of the invention is to provide parts in connection with the feeding mechanism whereby a separation of any loose grains which may have been left in the straw at threshing time is effected and whereby the grain collected may be delivered into a suitable receptacle removably supported from the carrying vehicle so that grain deposited therein may be easily removed.

In accomplishing these objects, I have provided improved details of structure, the preferred forms of which are illustrated in the accompanying drawings, wherein:—

Figure I is a side elevation of a distributing device constructed according to the present invention, mounted on a vehicle and showing its driving connection therewith.

Fig. II is a longitudinal, sectional view of the same parts, particularly illustrating the feeding and distributing mechanism and showing the separating agitator.

Fig. III is a plan view of the same parts.

Fig. IV is a detail perspective view of a part of the vehicle floor, the conveyer frame and one of the anchor members.

Fig. V is a detail view of the mechanism for tightening the delivery disk driving chain.

Fig. VI is a detail view of one of the adjustable sprocket carrying members for supporting the feeding belt.

Fig. VII is an enlarged sectional view through the agitator mechanism for separating the grains from the straw.

Referring more in detail to the drawings:—

1 designates a rack of the ordinary type, used in farm work for carrying hay, straw or the like, comprising a floor 2, which supports the opposite side frames 3—3' and end boards 4 which form the walls of the rack; the floor being supported by the cross beams 5 and bed sills 6, which in turn, when mounted on a carrying vehicle are seated on the bolsters 7 and between the standards 8—8' of the wagon gears, also comprising a rear axle 9 whereon the ground wheels 10—10 are mounted.

At its rear end the rack is provided with an opening 11 through which material may be delivered into the spreading mechanism 12, later described in detail; the opening preferably being of such size that it will receive the said mechanism therein without leaving an open space whereby a waste of material would be permitted, and is located centrally within the rear wall of the rack so that proper attachment may be made to a ground wheel or wheels whereby the delivery mechanism is operated.

The spreading device 12 comprises a hopper body of a box-like character, having an open forward side and when properly located, registers with the rack opening 11 to receive the material delivered from the rack, and having a base opening 15 through which the material is passed from the hopper into a delivery basket 16 suspended therefrom, where the material is torn apart and discharged onto a spreading disk 17, later described in detail.

The spreading mechanism, including the hopper 13, basket 16, disk 17, and the driving gear therefor, is constructed and supported from the rack as a unit and the members supporting the mechanism form the frame work over which a conveyer mechanism is operated to deliver material into the hopper from the rack.

The hopper 13 in its preferred construction comprises the opposite side walls 18—18′ which are held substantially in vertical, spaced relation by upper and lower cross beams 19—20 respectively at the rear of the hopper, and at its forward side by the several cross shafts which carry the feeding and driving parts presently described. The hopper and spreading mechanism are supported by a conveyer frame, forming a part of the unitary construction, and comprising parallel, spaced side rails 22—22′ that are removably attached to the floor of the rack and which extend rearwardly through the rack opening 11 and are attached securely to the opposite side walls of the hopper 13 to support the latter in proper functional position relative to the opening 11 and the driving gearing fixed to the vehicle.

In order to retain the device securely in proper alinement when in operation, and at the same time provide a quick and easy attachment or detachment of the spreader unit from the supporting floor of the vehicle to which it is applied, I have provided brackets 25—25′ which are secured to the floor 2 in paired relation respectively at the forward and adjacent the rearward ends of the conveyer frame; the said brackets each comprising horizontal apertured base portions 26 through which bolts 27 are extended to anchor the brackets to the floor 2, and having vertical portions 28 turned upwardly from the base portion between which the conveyer frame is located, to hold the same against any possible lateral movement. The vertical portions of the rearward brackets are unattached to the frame, but the forward brackets 25 are apertured so that the bolts 29 may be extended therethrough and through registering longitudinally extending slots 30 in the conveyer rails to anchor the forward end of the frame securely to the floor, and at the same time permit longitudinal adjustment of the frame for tightening the driving chain presently mentioned.

With this method of attachment, it is apparent that to remove the device from the rack it is only necessary to withdraw the bolts 29 from the forward pair of brackets and to slide the frame rearwardly from between the brackets and from the rack opening; it not being necessary to detach the brackets from the floor of the rack, as they will in no way interfere with the use of the rack for other purposes. The device is as easily attached as it is detached, by a reversal of the above operation.

Revolubly mounted in upper and lower bearings 32 and 33, fixed respectively on the cross beams 19—20 at the rear of the hopper, is a vertical shaft 34 which extends centrally through and terminates beneath the basket 16, and fixed on the upper end of said shaft is a bevel gear pinion 35′ that travels in mesh with and is driven by a larger bevel gear wheel 36 mounted on a horizontal shaft 37 carried at its ends in bearings 38—38 mounted at opposite sides of the hopper frame 13.

Mounted on the lower end of the shaft 34, beneath the basket opening, is the horizontally disposed disk 17, of slightly greater diameter than the basket opening and is adjustable on the shaft toward or from the said opening, and may be fixed at any adjusted position relative thereto by means of a set screw 41 which is threaded through the supporting collar 42 fixed on the under side of the disk and may be tightened against the shaft whereby the disk is revolved.

The disk 17, in its preferred form, comprises a circular sheet metal plate having a downturned peripheral flange 43 whereby stiffness and rigidity are given the disk and which permits the disk to be made of a much lighter material than is otherwise possible.

On the upper face of the disk are upstanding, radially mounted vanes 44 whereby, when the disk is being revolved, material delivered thereunto is thrown outwardly and scattered over the ground surface; it being apparent that the vanes give the material a much wider throw than would be possible if the disk were left smooth; the throw being determined by the adjustment of the disk toward or from the basket opening.

Clamped onto the shaft 34 and adapted to revolve in a horizontal plane within the basket 16, are oppositely extending agitator arms 46, the latter comprising flat metal bars that are turned edgewise toward the direction of travel and are curved rearwardly and slightly downwardly at their ends so as to effect an augering operation to force the material downwardly toward the disk and by rapid operation tear apart all clogged bunches of material entering the basket, and deliver it equally over all parts of the distributing disk.

Means for feeding material from the rack into the hopper comprises primarily a conveyer which is located between the side rails 22—22' and over a floor 50 supported by the side rails. The conveyer comprises spaced endless chain belts 51—51' which are connected at intervals by cross slats 52 and which run over sprocket wheels 53—54 on transverse shafts 55—56 revolubly mounted respectively between the inner ends of the frame rails and adjacent the hopper opening, so that rearward travel of the upper section of the belt will carry material thrown thereonto into the hopper opening; the shaft 56 being adjustably mounted at the forward end of the conveyer frame so that by adjustment of anchor bolts 57 connected thereto the conveyer belt may be suitably tensioned.

I also provide means within the hopper for effecting a forced feed of material, delivered through the hopper onto the delivery disk, and for insuring a more thorough tearing apart of the material before it is delivered to the distributers. This means consists of a conveyer, comprising spaced endless chain belts 58—58' which are joined by transverse slats 59, having teeth 59' extending outwardly therefrom and inclined rearwardly from the direction of travel so that the material will not be carried with the belt; the conveyer being mounted at its upper end on paired sprocket wheels 60 fixed in spaced relation on a transverse shaft 62 revoluble, at the upper forward end of the hopper, in bearings 62' adjustably fixed to the opposite sides of the frame, and at its lower end runs over sprocket wheels 63 revolubly mounted on the shafts 64 supported on arms 65 that are adjustable toward or away from the shaft 62 by means of belt and slot connections with the side frames of the hopper, so that the chains of the conveyer may be tensioned as is required to insure a desirable feeding result, and so that material delivered into the hopper will be caught by the downwardly traveling slats and teeth thereon and moved into the basket where it is caught by the revolving arms 46 and after being torn apart thereby, is discharged onto the delivery disk.

To operate the conveyer rake, the conveyer and the delivery disk, I provide a drive shaft 66 which I extend transversely through the conveyer frame adjacent the shaft 55 and beyond the sides of the frame. At one end of the shaft, I slidably key a clutch collar 68 having teeth 69 at one side thereof adapted to interlock with oppositely facing teeth 70 on the inner face of a sprocket wheel 71 revolubly mounted at the end of the shaft. Running over said sprocket wheel and over a gear ring 72 fixed by means of U-bolts 73 to the spokes 74, concentrically on the ground wheel 10, is a chain belt 75, whereby, when the clutch parts are in mesh, forward travel of the vehicle will cause the shaft 66 to be revolved.

At the end of the shaft 66, opposite the sprocket wheel 71 is a gear wheel 77 and adjacent thereto is a sprocket wheel 78; the gear wheel 77 being in mesh with a gear wheel 79 fixed on the projecting end of the conveyer shaft 53. A chain belt 80 is extended over the sprocket wheel 78 and a similar sprocket wheel 81 fixed on the end of the shaft 66 will simultaneously revolve the shaft 55 to cause a rearward travel of the upper section of the conveyer belt and, through the belt 80 and meshing gear wheels 35—36, cause the delivery disk to be revolved.

Fixed on the end of the shaft 37 opposite the sprocket wheel 81 is a sprocket wheel 85, and running thereon and over a sprocket wheel 86 fixed in alinement therewith on the end of the conveyer supporting shaft 62 is a chain belt 87 whereby the conveyer is operated simultaneously with the travel of the other parts. It is preferred to so gear the driving mechanism operating the inclined conveyer and horizontal conveyer so that the inclined conveyer belt will move approximately twice as fast as the horizontal conveyer belt, so that material carried in bunches to the hopper will be combed out and the bunches separated as they enter the hopper.

To retain the belt 80 at a desirable tension I provide a tightening device comprising an arm 88 that is pivotally and adjustably mounted on the hopper frame by means of a bolt 89 and at its movable end carries a sprocket wheel 89' over which the belt 80 is adapted to travel; the arm being so located that, by a proper adjustment, the chain may be given any desired tension.

In order to increase the utility of the device I have provided an agitator that operates in connection with the conveyer mechanism, whereby a great amount of grain, which is not removed from the straw at the time the grain is threshed, may be separated from the straw as it is delivered into the distributing hopper. To accomplish this result, the floor 50 of the conveyer is made to terminate forwardly of the rear end of the conveyer, leaving an open space between its rear edge and the shaft 66, and spanning the space between the shaft 55 and floor is an agitator or sifting device 90 over which the straw is moved as it is carried into the hopper. In the floor of the vehicle on which the device is mounted, adjacent the forward end of the conveyer, I provide an opening 92 beneath which I suspend a catch box or drawer 93, which preferably operates as a drawer, so that it may be easily removed and its contents poured therefrom.

To carry the conveyer belt across the opening 92 I span the latter at intervals with slats 92′ extended in the direction of travel of the belt and on which it may slide.

The agitator 90 comprises a cross bar 94, provided at its opposite ends with downturned ears 95 wherethrough bolts 96 are extended to pivotally support the bar transversely across the frame adjacent the rear edge of the upper floor 50. Extending rearwardly from the opposite ends of the bar 94 are arms 97 which overlie the shaft 66 and are adapted to be engaged by the opposite ends of pins 98, extending through the said shaft, as the latter revolves to cause an upward and downward agitation of fingers 99 mounted on and extending rearwardly in closely spaced relation from the cross bar 94 and are supported at their rearward ends on the shaft 55.

With this arrangement, it is apparent that as the straw is thrown onto the conveyer belt and carried rearwardly over the agitator, the movement of the agitator fingers against the straw as it moves thereover will cause the grains to sift through the straw and fingers onto the vehicle floor, where it is caught up by the conveyer slats and is moved forwardly between the conveyer frame rails and delivered through the opening 92 into the catch drawer 93. When the drawer is filled with grain, or at such other times as necessary, it may be drawn from its mounting, and its contents poured therefrom.

All of the moving parts of the device are thrown into or out of operation by actuation of the clutch collar 68 into or from mesh with the sprocket wheel 71. To move the said collar I provide a shipper lever 100, supported pivotally by a bracket 101 from the hopper frame and which may be actuated by a vertical lever 108 supported pivotally by a bracket 109 and connected at its lower end with the free end of the lever 100. Normally the clutch parts are held in mesh by a coil spring 110 that is wound about the portion of the drive shaft between the conveyer frame and clutch collar, and bearing thereagainst, but may be moved apart by inward movement of the upper end of the lever 109 which may be locked by a suitable latch indicated at 112 to hold the parts in disconnected relation.

Assuming that the device is so constructed, to mount and operatively connect the same with a supporting vehicle and rack, the sprocket ring 72 is first attached by the U-bolts to the wheel 10 and the brackets 25—25′ are fixed to the rack floor in such spaced relation that the conveyer frame will fit, without any lateral play, therebetween.

The conveyer frame is then moved through the rear rack opening and seated between the brackets 25—25′, with the open side of the hopper located adjacent the end opening of the rack. The drive chain 75 is then extended over the gear ring 72 and the sprocket wheel 71 to effect the driving connection and the bolts 29 extended through the apertures of the brackets 25 and slots 30 of the rails 22—22′ to anchor the parts all in operative position.

With the wagon moving forwardly, the clutch collar 68 is shifted by actuation of the shift lever 108 to throw the parts in gear to move the conveyer rearwardly and simultaneously drive the conveyer and delivery disk.

Material delivered onto the conveyer is carried thereby into the hopper and is caught by the rapidly moving conveyer belt teeth and the material torn apart and combed into the basket, where it is caught by the horizontally driven arms 46 and augered downwardly onto the delivery disk, whereby it is thrown or scattered over the ground surface.

With the parts so constructed, and the inclined conveyer belt geared so that it travels at a greater rate than the horizontal conveyer belt, it will be seen that the material delivered thereto in bunches will be combed apart and the material delivered endwise into the delivery basket, where it is then caught up by the arms 46, which travel transversely to the travel of the feeding belts. This effects a thorough breaking or tearing of all clogged bunches of material, which is delivered onto the delivery disk in a thoroughly separated state, so that an even spread is insured.

The advantage and simplicity of the present attaching devices are also apparent, as it will be readily seen that, when once set in position on the rack floor, it is not necessary to remove the brackets, as they will in no way interfere with the use of the rack for other purposes, when the distributing device is removed, and will serve, when the device is in place, to substantially retain the same in perfect alinement relative to the rack opening and the driving mechanism.

It is further apparent that by providing the conveyer with the grain separating and catching parts, a great amount of grain that would otherwise be wasted can be saved.

Having thus described my invention, what I claim as new therein, and desire to secure by Letters-Patent, is:—

1. A spreading device comprising a hopper having intake and discharge openings, means for delivering material into the hopper, means for feeding the material to the discharge opening of the hopper, a rotating shaft extending below the hopper, radial arms on the shaft below the hopper, and a distributer carried by the shaft below the radial arms.

2. A spreading device comprising a hopper having intake and discharge openings, a conveyer for delivering material into the hopper through the intake opening, a feed belt operating within the hopper for forcing the delivery of intaken material from the discharge opening, and a horizontally disposed spreading mechanism to receive the material from the discharge end of the hopper, said spreading mechanism discharging the material by centrifugal force.

3. A spreading device comprising a hopper having intake and discharge openings, a conveyer for delivering material into the hopper through the intake opening, a feed belt operating within the hopper, in conjunction with but at a greater lineal speed than the conveyer, for forcing the delivery of intaken material from the discharge opening thereof, and a centrifugally operating spreading disk below the hopper having radial arms rotatable therewith.

4. A spreading device comprising a hopper having intake and discharge openings, a conveyer for delivering material into the hopper through the intake opening, a revoluble spreading element suspended beneath said discharge opening, said element comprising a disk having radial arms supported thereon, and a feeding belt operating within the hopper in conjunction with the conveyer for forcing a feed of material through the hopper onto the spreading element.

5. In combination with a vehicle body, of a hopper carried thereby having an intake opening to receive material from the body of the vehicle, a horizontal conveyer carried by the vehicle for introducing the material into the hopper, a conveyer belt, having tearing teeth, inclined within the hopper to feed the material through the discharge opening thereof, a shaft extending through the bottom of the hopper, a delivery basket adjacent to the discharge end of said hopper, radial arms within the delivery basket and driven by the shaft, and a disk spaced below the radial arms, said disk also being supported by the shaft.

6. The combination with a vehicle body of a spreading device comprising a frame mounted within said body and extending therefrom a hopper supported by said frame at the rear end of said body and having an opening for receiving material therefrom and having a discharge opening at the base thereof, a conveyer mounted in said frame within the vehicle body, a revoluble spreading element suspended beneath the hopper discharge opening, and a feeding belt operating within the said hopper for forcing a feed of material through the hopper openings and onto the delivery element.

7. The combination with a vehicle body of a spreading device comprising a supporting frame removably mounted within said vehicle body and extending therefrom, a receiving hopper mounted at the extended end of said frame, and having an opening for receiving material therein from the vehicle and having a base discharge opening, a conveyer belt mounted in the frame within said vehicle for delivering material into the hopper, a revoluble spreading disk suspended beneath the discharge opening thereof, a feeding belt mounted within the hopper for forcing a discharge of material onto the delivery disk, and mechanism for simultaneously driving the conveyer, feed belt and delivery disk.

8. The combination with a vehicle body, of a vertical hopper secured to the rear end thereof and provided with a lateral inlet opening and a vertical discharge opening, means for feeding material into the hopper from the body of the vehicle, an inclined conveyer for feeding material from the hopper through the discharge opening thereof, a delivery basket comprising a hood provided with depending flanges and having an inlet alining with the discharge opening of the hopper, a depending shaft within the hood having an end extending beyond the flanges thereof, radial arms carried by the shaft within the hood, and a distributer disk on the shaft below the hood.

9. The combination with a vehicle body of anchor members fixed to the floor thereof in paired and spaced relation, and comprising vertical, coöperating guide portions, a spreading device comprising a supporting frame mounted on said body floor between said anchor members, and bolts extending through some of said anchor guide portions and through parts of said supporting frame for the purpose set forth.

10. The combination with a vehicle body having anchor members fixed in spaced relation to the floor thereof, of a spreading device comprising a supporting frame supported on said vehicle body floor between said anchor members and extending therefrom, a spreading element supported by the extended portion of said frame, a conveyer in said frame within the vehicle body, and means for removably attaching said frame to said anchor members for the purpose set forth.

11. The combination with a vehicle body having a floor, of guide members fixed in spaced relation adjacent the rear of said vehicle and paired anchor members fixed to the said floor in coöperating relation with the guide members and forwardly thereof, said anchor members having upturned apertured portions, a spreading device having a supporting frame comprising side rails removably mounted on said floor between the guide and anchor members and having apertures therethrough in registration with the apertured portions of the latter, and bolts removably extended through said registering apertures to anchor the said frame to the vehicle body.

12. The combination with a vehicle body floor having an opening therein and a conveyer mechanism comprising spaced side beams having a floor spaced above the vehicle body floor, of a conveyer belt operating rearwardly over the upper floor and forwardly over the lower floor and across said floor opening for the purpose set forth.

13. The combination with a vehicle body floor having an opening therein and a conveyer mechanism comprising spaced side beams having a floor spaced above the vehicle body floor, and provided with an opening rearwardly of the first named opening, of a conveyer belt operating rearwardly over the upper floor and forwardly over the vehicle body floor and across said openings for the purpose set forth.

14. The combination with a vehicle body having an opening in the floor thereof, of a spreading device comprising a supporting frame extended within said vehicle body and overlying said opening in the floor thereof, a spreading element supported by said frame at the rear of said vehicle body, a conveyer belt mounted within said frame and adapted to travel across said opening, and a catch box removably suspended from said floor beneath said opening.

15. The combination with a vehicle body having an opening in the floor thereof, of a spreading device comprising a conveyer frame extending across said floor opening, a sifting agitator operatively mounted in said conveyer frame, and a conveyer belt operating over said agitator and vehicle floor opening for the purpose set forth.

16. The combination with a vehicle body having an opening in the floor thereof, of a spreading device comprising a supporting frame extending within said vehicle above said opening, and comprising a floor spaced above the vehicle floor, an agitator mounted in said conveyer frame rearwardly of said floor opening, comprising a pivotally mounted cross bar having fingers extending therefrom in closely spaced relation, a conveyer belt mounted in said frame adapted to move rearwardly over said agitator and forwardly across said floor opening, means for driving said belt and means for actuating the agitator from the belt driving means.

17. The combination with a vehicle body having an opening in the floor thereof, of a spreading device mounted at the rear of a said body and having a supporting frame extending thereinto and fixed to said floor to overlie said opening; said supporting frame comprising spaced side rails, a floor supported between said rails above the vehicle body floor an agitator mounted in the upper floor rearwardly of the vehicle floor opening, a conveyer belt operating between said rails and comprising a rearwardly moving section supported by said supporting frame floor and a forwardly moving section supported on said vehicle body floor and moving across said agitator and vehicle floor opening for the purpose set forth.

18. A spreading device comprising a hopper having front intake and bottom discharge openings, a conveyer for delivering material into said hopper through the said intake opening, a shaft rotatably supported by the hopper and suspended through said discharge opening, a spreading disk fixed to said shaft beneath said delivery opening, a feed belt having teeth thereon for taking up material from the conveyer belt and operating to move material from the intake to the discharge opening, and agitator arms fixed to said disk suspending shaft above said disk and adapted to revolve transversely across the path of the material delivered from said feed belt for the purpose set forth.

19. A spreading device comprising a hopper having front intake and bottom discharge openings, a conveyer for delivering material into said hopper through the said intake opening, a shaft rotatably supported by the hopper and suspended through said discharge opening, a spreading disk fixed to said shaft beneath said delivery opening, a feed belt having teeth thereon for taking up material from the conveyer belt and operating at a greater linear speed than the delivery conveyer, and adjustable arms fixed to said disk supporting shaft having downturned end portions adapted to revolve transversely across the path of material delivered from said feed belt.

20. In a spreading device, a hopper having front intake and bottom discharge openings, a conveyer for delivering material into the intake opening, a shaft rotatably supported by said hopper and suspended vertically through said bottom opening, a delivery disk fixed on said shaft below said opening, shafts mounted transversely across said hopper, an endless feed belt operated over and by said shafts and adapted to move at a greater linear speed than the conveyer belt, teeth fixed on said feed belt for combing the material delivered from the conveyer belt, and agitator arms fixed to the disk supporting shaft and adapted to move transversely across the path of material delivered from the said feed belt and mechanism for simultaneously driving the said conveyer, feed belt and disk supporting shaft for the purpose set forth.

In testimony whereof I affix my signature.

HALBERT C. WALLACE.